(12) United States Patent
Sonobe et al.

(10) Patent No.: US 9,624,980 B2
(45) Date of Patent: Apr. 18, 2017

(54) BEARING DEVICE AND HALF BEARING USED FOR THE SAME

(71) Applicant: DAIDO METAL COMPANY LTD., Nagoya-shi, Aichi-ken (JP)

(72) Inventors: Hiromi Sonobe, Inuyama (JP); Yuta Nakano, Inuyama (JP)

(73) Assignee: DAIDO METAL COMPANY LTD., Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/931,032

(22) Filed: Nov. 3, 2015

(65) Prior Publication Data
US 2016/0131191 A1    May 12, 2016

(30) Foreign Application Priority Data
Nov. 7, 2014   (JP) .................................. 2014-226972

(51) Int. Cl.
*F16C 33/02*   (2006.01)
*F16C 35/02*   (2006.01)
(Continued)

(52) U.S. Cl.
CPC .............. *F16C 35/02* (2013.01); *F16C 7/023* (2013.01); *F16C 33/08* (2013.01); *F16C 33/12* (2013.01);
(Continued)

(58) Field of Classification Search
CPC .... F16C 9/02; F16C 9/04; F16C 33/08; F16C 35/02; F16C 2240/54
(Continued)

(56) References Cited

U.S. PATENT DOCUMENTS

| | | | |
|---|---|---|---|
| 5,456,538 A | 10/1995 | Honda et al. | |
| 7,387,098 B2 * | 6/2008 | Waseda ................... | F01L 1/185 123/90.44 |
| 2006/0005702 A1 | 1/2006 | Andler et al. | |

FOREIGN PATENT DOCUMENTS

| | | | | |
|---|---|---|---|---|
| DE | EP 2311605 A1 * | 4/2011 | ............. | F16H 55/06 |
| EP | 1748225 A1 | 1/2007 | | |

(Continued)

OTHER PUBLICATIONS

European Search Report dated Mar. 16, 2016, in corresponding European application No. EP15193107.
(Continued)

*Primary Examiner* — Phillip A Johnson
(74) *Attorney, Agent, or Firm* — Browdy and Neimark, PLLC (57) ABSTRACT

A bearing device includes a bearing member provided with a circumferentially extending sliding surface and a housing holding the bearing member on an inner circumferential surface thereof. The bearing member is provided with a bearing outer peripheral surface on one side thereof facing the housing. The bearing outer peripheral surface is surface roughened. The housing is provided with a housing inner peripheral surface on one side thereof facing the bearing member. The housing inner peripheral surface is surface roughened. When a mean height Rc of a roughness curve element of either of the bearing outer peripheral surface and the housing inner peripheral surface is X μm, the remaining other of the bearing outer peripheral surface and the housing inner peripheral surface has a material ratio Rmr (X μm) of roughness curve being equal to or less than 10% in at least one measurement direction.

7 Claims, 5 Drawing Sheets

(51) Int. Cl.
*F16C 43/02* (2006.01)
*F16C 7/02* (2006.01)
*F16C 33/12* (2006.01)
*F16C 33/08* (2006.01)
F16C 35/067 (2006.01)
F16C 43/00 (2006.01)

(52) U.S. Cl.
CPC ............ *F16C 43/02* (2013.01); *F16C 35/067* (2013.01); *F16C 43/00* (2013.01); *F16C 2202/04* (2013.01); *F16C 2223/00* (2013.01); *F16C 2226/12* (2013.01); *F16C 2226/52* (2013.01); *F16C 2226/80* (2013.01); *F16C 2240/54* (2013.01)

(58) Field of Classification Search
USPC .......................... 384/429, 432, 433, 434, 625
See application file for complete search history.

(56) References Cited

FOREIGN PATENT DOCUMENTS

| | | | |
|---|---|---|---|
| JP | 2666564 | B2 * | 10/1997 |
| JP | 10159853 | A | 6/1998 |
| JP | 200663995 | A | 3/2006 |

OTHER PUBLICATIONS

Korean Office Action for corresponding Korean Application Dispatch No. 9-5-2016-081334103 date Nov. 11, 2016.

* cited by examiner

| SAMPLE NO. | BEARING OUTER PERIPHERAL SURFACE | | HOUSING INNER PERIPHERAL SURFACE | | X (μm) | MATERIAL RATIO OF ROUGHNESS CURVE Rmr X (μm) (%) | EVALUATION |
|---|---|---|---|---|---|---|---|
| 1 | Rc | 3.7 μm | Rc | 7.0 μm | 3.7 | 2.1 | ◎ |
|   | Rmr(30%) | 57% | Rmr(30%) | 38% |   |   |   |
| 2 | Rc | 5.9 μm | Rc | 2.6 μm | 2.6 | 3.0 | ◎ |
|   | Rmr(30%) | 64% | Rmr(30%) | 51% |   |   |   |
| 3 | Rc | 0.59 μm | Rc | 7.5 μm | 0.59 | 3.3 | ◎ |
|   | Rmr(30%) | 58% | Rmr(30%) | 37% |   |   |   |
| 4 | Rc | 4.6 μm | Rc | 7.1 μm | 4.6 | 4.0 | ○ |
|   | Rmr(30%) | 55% | Rmr(30%) | 38% |   |   |   |
| 5 | Rc | 4.3 μm | Rc | 6.9 μm | 4.3 | 4.3 | ○ |
|   | Rmr(30%) | 57% | Rmr(30%) | 47% |   |   |   |
| 6 | Rc | 5.2 μm | Rc | 6.7 μm | 5.2 | 10.7 | × |
| 7 | Rc | 6.5 μm | Rc | 5.9 μm | 5.9 | 11.2 | × |
| 8 | Rc | 5.7 μm | Rc | 6.9 μm | 5.7 | 10.8 | × |

FIG. 8

BEARING DEVICE AND HALF BEARING USED FOR THE SAME

CROSS-REFERENCE TO RELATED APPLICATION

This application is based upon and claims the benefit of priority from Japanese Patent Application No. 2014-226972, filed on, Nov. 7, 2014 the entire contents of which are incorporated herein by reference.

FIELD OF THE INVENTION

The present invention relates to a bearing device and a half bearing used for the same.

BACKGROUND OF THE INVENTION

There are recent demands to reduce the weight of engines for further improvement in fuel efficiency. Various structures, one typical example of which is an engine housing, are becoming less rigid as they become more compact and lighter. As a result, the engine housing undergoes greater deformation during engine operation. In these engines, a bearing member is held by a housing. When the housing and the bearing member undergo greater deformation daring operation, macro slipping occurs between the outer peripheral surface of the bearing member and the inner peripheral surface of the housing which may cause fretting damages. Thus, JP H10-159853 A and JP 2006-63995 A teach reducing relative micro slipping between the bearing member and the housing by surface roughening at least either of the outer peripheral surface of the bearing member and the inner peripheral surface of the housing.

However, while surface roughening reduces relative micro slipping, it is also prone to excessively increase the frictional resistance between the outer peripheral surface of the bearing member and the inner peripheral surface of the housing. The bearing member, being circumferentially divided, is pushed together so as to be squeezed from its outer peripheral side by the housing when being assembled with the housing. The bearing member is thus, secured to the housing. The outer diameter of the bearing member is designed to be slightly greater than the inner diameter of the housing. Hence, the bearing member is secured tightly with the housing by being squeezed by the housing from its outer peripheral side. However, excessive frictional resistance exerted between the outer peripheral surface of the bearing member and the inner peripheral surface of the housing inhibits even a small amount of overall or general movement of the housing and the bearing member when the bearing member is assembled with the housing. As a result, the stress applied to the divided bearing members by the squeezing of the housing concentrates at the interface, where the divided bearing members are put together, without being distributed throughout the bearing members. Thus, the bearing members deform largely in the vicinity of the interface, where the divided bearing members are put together, causing the bearing members to protrude toward the inner peripheral side at the vicinity of the interface. The bearing members protruding toward the inner peripheral side causes local contact with the counter member, which may be a shaft, during bearing device operation. Such local contact may produce heat and possibly cause damages to the engine.

SUMMARY OF THE INVENTION

It is thus, one object of the present invention to provide a bearing device which permits movement of the bearing member and the housing when assembling the bearing member and the housing while inhibiting fretting damages. It is another object to provide a half bearing for use with such bearing device.

A bearing device includes a bearing member provided with a circumferentially extending sliding surface and a housing holding the bearing member on an inner circumferential surface thereof. The bearing member is provided with a bearing outer peripheral surface on one side thereof facing the housing. The bearing outer peripheral surface is surface roughened. The housing is provided with a housing inner peripheral surface on one side thereof facing the bearing member. The housing inner peripheral surface is surface roughened. When a mean height Rc of a roughness curve element of either of the bearing outer peripheral surface and the housing inner peripheral surface is X μm, the remaining other of the bearing outer peripheral surface and the housing inner peripheral surface has a material ratio Rmr (X μm) of roughness curve being equal to or less than 10% in at least one measurement direction.

The bearing outer peripheral surface and the housing inner peripheral surface, when subjected to surface roughening in the above described manner, contact each other while forming a clearance or spacing between their fine protrusions and recesses (also referred to as peaks and valleys or asperities). That is, when surface roughening is performed under the above described specifications, the spacing created by the protrusions and recesses of one of the bearing outer peripheral surface and the housing inner peripheral surface is greater than the spacing created by the protrusions and recesses of the other. Stated differently, the roughness, i.e. the protrusions and recesses of the bearing outer peripheral surface and the housing inner peripheral surface have different shape characteristics. By forming a clearance where the bearing outer peripheral surface and the housing inner peripheral surface contact one another, the protrusions of the bearing outer peripheral surface or the housing inner peripheral surface, in winch the material ratio of the roughness curve (or profile) has been controlled, are prone to easily deform by utilizing the clearance when force is applied. When the housing is fastened from the outer peripheral side of the bearing member in order to secure the bearing member to the housing, frictional resistance is exerted between the bearing outer peripheral surface and the housing inner peripheral surface. However, slight overall movement is allowed by the deformation of mostly the protrusions of either the bearing outer peripheral surface or the housing inner peripheral surface, in which the material ratio of the roughness curve has been controlled. In the present embodiment, the shape and consequently the clearance, i.e. the degree of interference of the confronting protrusions and recesses of the roughened bearing outer peripheral surface and the housing inner peripheral surface are controlled in addition to controlling the difference in the heights of the protrusions and recesses of the bearing outer peripheral surface and the housing inner peripheral surface. It is thus, possible to permit small amount of overall movement of the bearing member and the housing by the deformation of the protrusions and inhibit protruding of the fastened bearing member toward the inner peripheral side.

Because both the bearing outer peripheral surface and the housing inner peripheral surface configured as described above are surface roughened, sufficient frictional resistance is exerted to prevent relative micro slipping during bearing device operation. Thus, relative micro slipping between the bearing member and the housing during bearing device operation is limited, even when a housing exhibiting low rigidity is used, due to the frictional resistance exerted between the bearing outer peripheral surface and the housing inner peripheral surface. That is, the slight overall movement of the bearing member and the housing configured as described above is permitted when being secured together by fastening while also inhibiting local deformation and relative micro slipping of the bearing member and the housing during bearing device operation. As a result, it is possible to inhibit fretting caused by relative micro slipping of the bearing member and the housing.

Further, in the present embodiment, the bearing outer peripheral surface and the housing inner peripheral surface are provided with fine protrusions and recesses in which cut level is 50%, that is, fine protrusions and recesses in which the material ratio Rmr (50%) at 50% height of the maximum profile height of the roughness curve falls in the range of 20%≤Rmr (50%)≤80%. Protrusions and recesses satisfying these conditions are observed in two or more different measurement directions. Among the housing inner peripheral surface and the bearing outer peripheral surface, whichever having the smaller mean height Rc of the roughness curve element preferably has a material ratio Rmr (50%) of the roughness curve falling in the range of 40%≤Rmr (50%)≤60% from the standpoint of improving fretting resistance.

Further, among the housing inner peripheral surface and the bearing outer peripheral surface, whichever having the smaller mean height Rc of the roughness curve element preferably has Rc falling in the range of Rc≤4 µm.

In the present embodiment, the bearing outer peripheral surface and the housing inner peripheral surface are surface roughened at least in a portion along the circumferential direction where fretting damages occur. Fretting damages occur by the relative micro slipping of the bearing member and the housing caused by the deformation of at least either of the bearing member and the housing.

Further, in the present embodiment, the housing is provided on one end of the connecting rod opposite of the end being connected to an engine piston. Surface roughening is applied in a range of the bearing outer peripheral surface and the housing inner peripheral surface extending from −70 degrees to −30 degrees and from 30 degrees to 70 degrees centered on the axial center of the bearing member when the longer side direction of the connecting rod is defined as "0 degrees".

The relative micro slipping of the housing and the bearing member is prone to occur at a portion of the circumference of the bearing member rather than throughout the entire circumference of the bearing member. Thus, surface roughening is applied on a portion where relative micro slipping of the housing and bearing member and consequently fretting damages are prone to occur. It is thus, possible to reduce occurrence of fretting while reducing machining steps for achieving such effects.

The above described bearing member may be a half bearing which is circumferentially divided in two.

It is possible for the engine to prevent fretting damages by being provided with the bearing device described above.

DETAILED DESCRIPTION OF THE INVENTION

One embodiment will be described hereinafter with reference to the drawings. First, a description will be given on an engine employing a bearing device of the present embodiment. In one embodiment, the bearing device is used for example in a diesel engine or a gasoline engine application.

Figure 1:
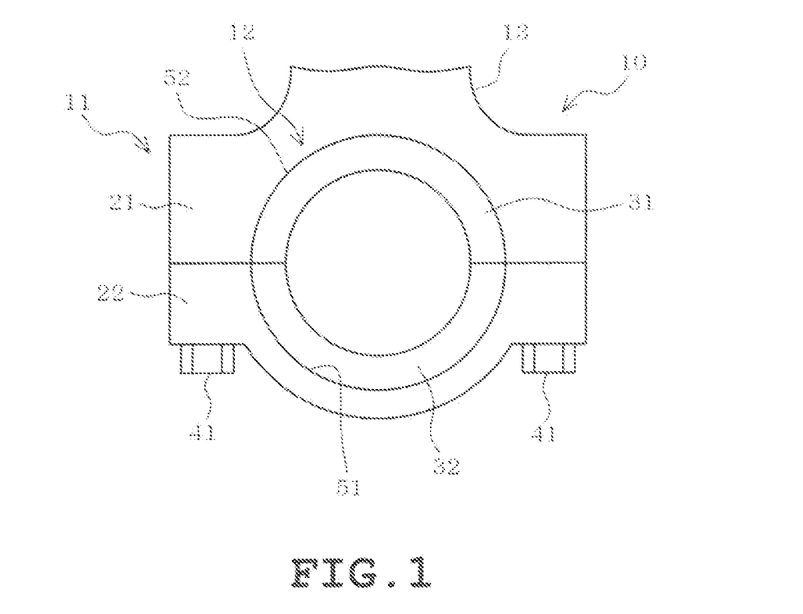
FIG. 1 is a view briefly illustrating one embodiment of a bearing device.
Figure 2:
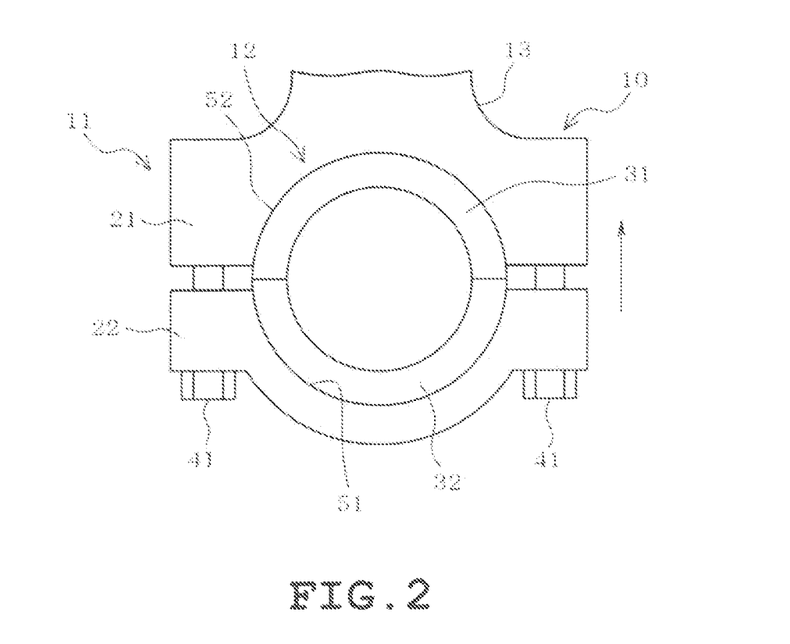
FIG. 2 is a view briefly illustrating how the bearing device illustrated in FIG. 1 is assembled.

As illustrated in FIGS. 1 and 2, the bearing device 10 is provided with a housing and a bearing member 12. In one embodiment, the housing 11 is a part of a connecting rod 13. One longer-side end of the connecting rod 13 located in the opposite side with respect to the housing 11 is concocted to a piston not illustrated. The housing 11 is provided with an upper housing 21 and a lower housing 22 which are separable from one another. The lower housing 22 scores a bearing member 12 in a space located between itself and the upper housing 21. In other words, the bearing member 12 is installed between the upper housing 21 and the lower housing 22. The bearing member 12 is formed in the shape of a cylinder and is divided in two along a surface encompassing its axial center. That is, the bearing member 12 is formed of an upper member 31 and a lower member 32 each being a half bearing shaped like a half cylinder.

The bearing member 12 being divided in two is installed between the upper housing 21 and the lower housing 22. As illustrated in FIG. 2, the upper housing 21 and the lower housing 22 being independent of one another are assembled as one as illustrated in FIG. 1 by a fastening member such as bolts 41. The bolts 41 extending through the lower housing 22 are screwed into the upper housing 21 to connect the upper housing 21 and the lower housing 22 in one while holding the divided bearing members 12 on their inner sides. The outer peripheral length of the bearing member 12 is slightly greater than the inner peripheral length or the housing 11. Thus, the bearing member 12 receives compression stress when the upper housing 21 and the lower housing 22 are fastened by bolts 41. The bearing member 12 is thus, secured firmly to the housing 11. External force oriented in the circumferential direction is exerted on the bearing member 12 to cause the bearing member 12 as a whole to move slightly relative to the housing. As a result, the stress applied to the bearing member 12 is distributed throughout the bearing member 12 without being concentrated on the circumferential end portions which are not placed in contact with the housing 11. As a result, the bearing member 12 as a whole is allowed to contract in the circumferential direction and be inhibited from projecting radially inward.

A description will be given hereinafter on the details of the bearing device 10 including the bearing member 12. In the present embodiment, the housing 11, formed of the upper housing 21 and the lower housing 22, has a housing inner peripheral surface 51 in the radially inward side thereof that contacts the bearing member 12. The bearing member 12, formed of the upper member 31 and the lower member 32, has a bearing outer peripheral surface 52 in the radially outward side thereof that contacts the housing 11. Surface roughening is applied to both the housing inner peripheral surface 51 and the bearing outer peripheral surface 52. The surfaces of both the housing inner peripheral surface 51 and the bearing outer peripheral surface 52 are roughened into protrusions and recesses. In the present embodiment, the surfaces of the housing inner peripheral surface 51 and the bearing outer peripheral surface 52 are roughened by shot peening for example. Further in the present embodiment, the housing inner peripheral surface 51 and the bearing outer peripheral surface 52 are surface roughened into shapes that have different characteristics.

Figure 3:
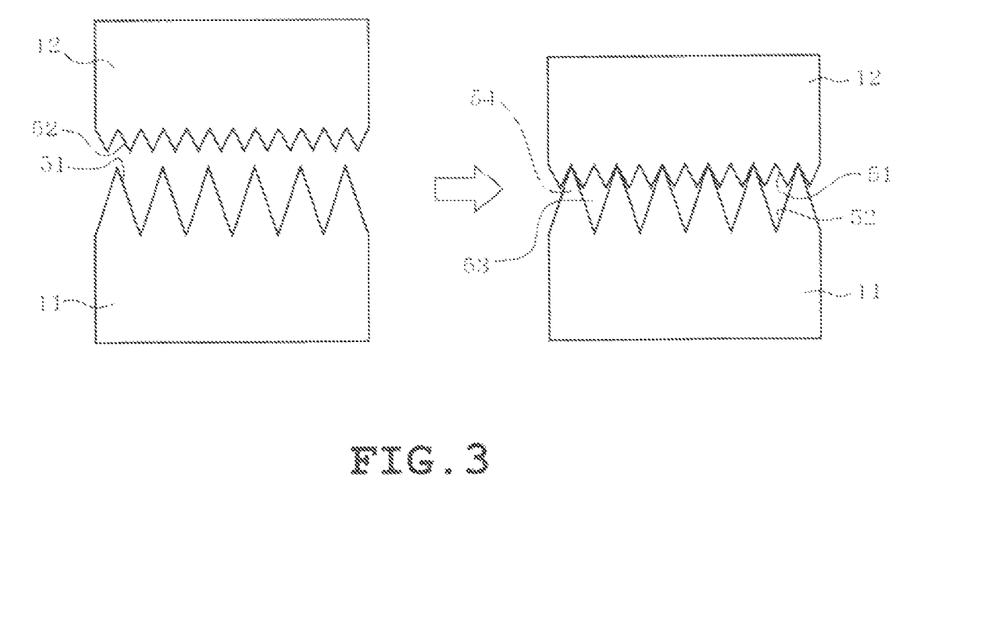
FIG. 3 is a schematic view illustrating a main portion of one embodiment of the bearing device.
Figure 4:
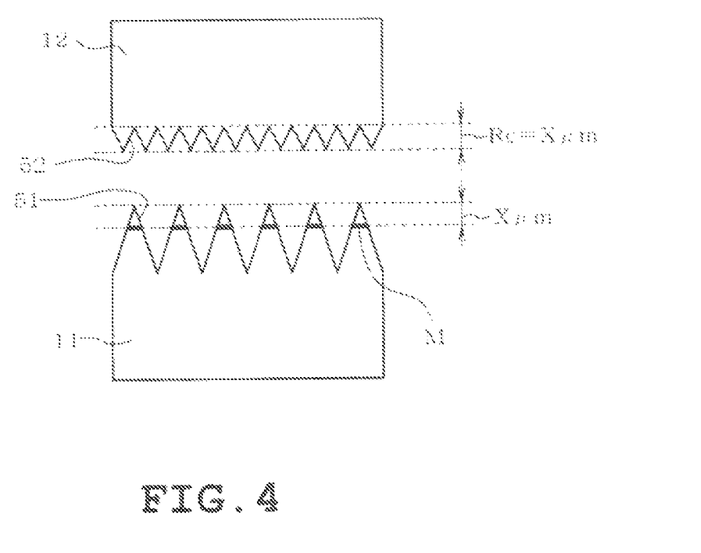
FIG. 4 is a schematic view illustrating a main portion of one embodiment of the bearing device.

In the example illustrated in FIG. 3, the bearing outer peripheral surface 52 of the present embodiment has finer protrusions and recesses compared to the housing inner peripheral surface 51. The characteristics of the shapes of the protrusions and recesses formed as rough surfaces are different. More specifically, when the mean height Rc of the roughness curve element of bearing outer peripheral surface 52 is Rc=X μm as illustrated in FIG. 4, the material ratio Rmr (X μm) of the roughness curve of the mating housing inner peripheral surface falls within the range of Rmr (X μm)≤10%. That is, when Rc of the bearing outer peripheral surface 52 is X μm, the protrusions and recesses of the housing inner peripheral surface 51 are cut at locations corresponding to where Rc=X μm. The material ratio Rmr (X μm) of the roughness curve at cut level X μm of the housing inner peripheral surface 51 is specified to 10% or less. The material ratio Rmr (X μm) of the roughness curve is a ratio of the material length M of the outline curve element with respect to one evaluation length.

Figure 5:
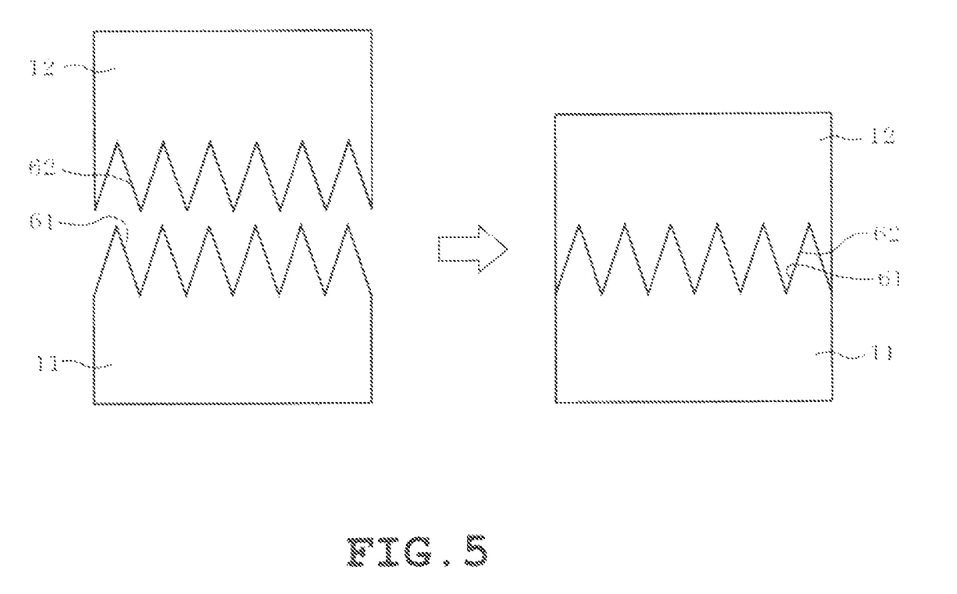
FIG. 5 is a schematic view illustrating a main portion of a conventional bearing device.

When Rmr (X μm)≤10% is satisfied, the protrusions and recesses of the housing inner peripheral surface 51 and the bearing outer peripheral surface 52 are shaped to have different characteristics as illustrated in FIGS. 3 and 4. Thus, when the housing inner peripheral surface 51 and the bearing outer peripheral surface 52 are placed in contact, clearance 53 exists between the protrusions and recesses of the housing inner peripheral surface 51 and the protrusions and recesses of the bearing outer peripheral surface 52 as illustrated in FIG. 1. In the present embodiment, the difference made to the shapes or the protrusions and recesses of the housing inner peripheral surface 51 and the protrusions and recesses of the bearing outer peripheral surface 52 causes the protrusions 54 to deform efficiently to prevent the protrusions and recesses of the housing inner peripheral surface 51 and the bearing outer peripheral surface 52 from being placed in firm engagement. FIG. 5 illustrates a conventional example in which the housing inner peripheral surface 61 of the housing 11 and the bearing outer peripheral surface 62 of the bearing device 12 are subjected to a simple surface roughening treatment. In this example, the protrusions and recesses of the housing inner peripheral surface 61 and the protrusions and recesses of the bearing outer peripheral surface 62 become firmly engages with one another with hardly any clearance existing therebetween when the housing inner peripheral surface 61 and the bearing outer peripheral surface 62 are placed in contact. In contrast, clearance 53 exists between the protrusions and recesses of the housing inner peripheral surface 51 and the protrusions and recesses of the bearing outer peripheral surface 52 in the present embodiment as illustrated in FIG. 3.

In the present embodiment described above, clearance 53 exists between the protrusions and recesses of the housing inner peripheral surface 51 and the protrusions and recesses of the bearing outer peripheral surface 52 when the housing inner peripheral surface 51 and the beating outer peripheral surface 52 are placed in contact with one another. The clearance 53 allows the bearing member 12 as a whole to move slightly in the circumferential direction. As illustrated in FIGS. 1 and 2, the bearing member 12 is held between the upper housing 21 and the lower housing 22 which are assembled in one by the bolts 41. Because the outer peripheral length of the bearing member 12 is slightly greater than the inner peripheral length or the housing 11, fastening of the bolts 41 causes circumferential stress to be exerted on the bearing member 12 at the inner side or the housing 11. In the present embodiment, clearance 53 is formed between the housing inner peripheral surface 51 and the bearing outer peripheral surface 52 as described above. Thus, the protrusions 54 of the housing inner peripheral surface 51 is allowed to deform by utilizing the room provided by the clearance 53. As a result, a small amount of relative and overall movement in the circumferential direction is permitted between the housing 11 and the bearing member 12. Thus, the circumferential stress applied to the bearing member 12 does not easily concentrate on the circumferential end portions of the bearing member 12 which is not placed in contact with the housing 11. Because the stress is distributed throughout the bearing member 12, excessive stress is not applied locally on the bearing member 12. Thus, local deformation of the bearing member 12, being fastened between the upper and lower housings 21 and 22, is reduced which in turn inhibits the radially inward protrusion of the bearing member 12.

Figure 6:
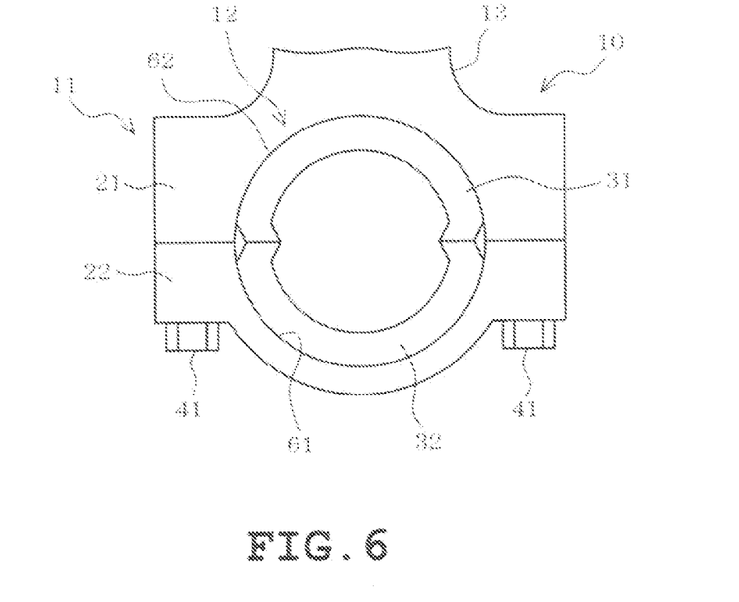
FIG. 6 is a view briefly illustrating a conventional bearing device.

In contrast, the housing 11 and the bearing member 12 engage too firmly in the conventional example in which only the difference in the heights of the protrusions and recesses are controlled as illustrated in FIG. 5. Thus, there is hardly any slight overall movement in the circumferential direction between the housing 11 and the bearing member 12 when the housing 11 and the bearing member 12 are assembled. As a result, the circumferential stress applied to the bearing member 12 concentrates at the circumferential end portions of the bearing member 12 without being distributed throughout the bearing member 12. Thus, deformation occurs at the interface portion of the divided bearing members 12 by the concentration of stress as illustrated in FIG. 6 when the bearing member 12 is fastened to the hosing 11. As a result, one interface portion protrudes radially inward.

In the present embodiment described above, sufficient frictional force is exerted between the housing inner peripheral surface 51 and the bearing outer peripheral surface 52 to inhibit micro slips during bearing device operation by the surface roughening treatment applied to the housing inner peripheral surface 51 and the bearing outer peripheral surface 52. It is thus, possible to inhibit relative micro slipping between the housing 11 and the bearing member 12 during bearing device operation. On the other hand, different shape characteristic are given to the protrusions and recesses of the surface roughened housing inner peripheral surface 51 and the bearing outer peripheral surface 52. Thus, the slight overall movement of the bearing member 12, when assembling the bearing member 12 with respect to the housing 11, is permitted by the surface roughening treatment performed under the above described conditions. As a result, the bearing device 10 of the present embodiment inhibits relative micro slipping of the housing 11 and the bearing member 12 during its operation which may cause fretting, while also inhibiting the radially inward protrusion caused by deformation occurring during assembly.

In the example described above, the protrusions and recesses of the bearing outer peripheral surface 12 is finer than the protrusions and recesses of the housing inner peripheral surface 51. The relation of the size of the protrusions and recesses may be the other way around. That is, the housing inner peripheral surface 51 may be finer than the bearing outer peripheral surface 52.

Further, the housing inner peripheral surface 51 and the bearing outer peripheral surface 52 may be specified so that the material ratio Rmr (50%) of the roughness curve at cut level 50% falls in the range of 20%≤Rmr (50%)≤80%. When 20%≤Rmr (50%)≤80%, the housing inner peripheral surface 51 and the bearing outer peripheral surface 52 both exhibit fine protrusions and recesses. The housing inner peripheral surface 11 and the bearing outer peripheral surface 52 preferably satisfy this condition in two or more different measurement directions. When this condition is satisfied in two or more different measurement directions, it is an indication that surface roughening of the housing inner peripheral surface 51 and the bearing outer peripheral surface 52 is not performed along a specific direction. Further, among the housing inner peripheral surface 51 and the bearing outer peripheral surface 52, whichever having the smaller Rc may have material ratio Rmr (50%) of the roughness curve falling in the range of 40%≤Rmr (50%)≤60%. Further, among the housing inner peripheral surface 51 and the bearing outer peripheral surface 52, whichever having the smaller Rc may have Rc falling in the range of Rc≤4 μm.

Figure 7:
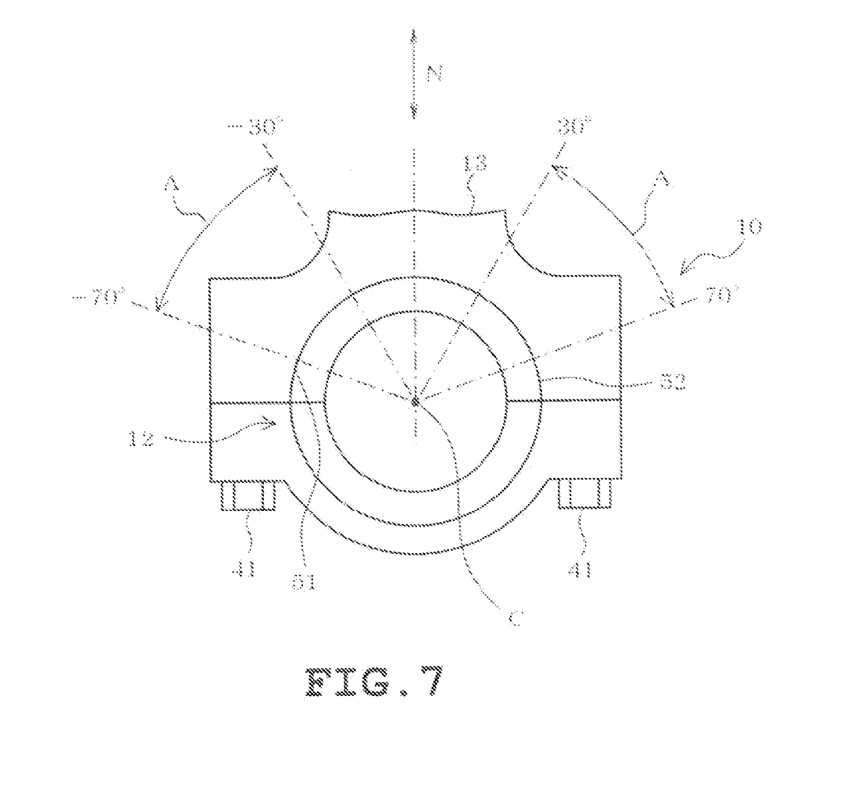
FIG. 7 is a view briefly illustrating the range in which surface roughening is performed in one embodiment of the bearing device.

During the operation of the bearing device 10, relative micro slipping of the housing 11 and the bearing member 12 as well as fretting caused by micro slipping are prone to occur locally as a portion of the circumference of the bearing member 12 rather than generally throughout the entire circumference of the bearing member 12. It is thus, possible to apply surface roughening on a portion where relative micro slipping of the housing 11 and bearing member 12 and consequently fretting damages are prone to occur. That is, it is sufficient to apply surface roughening on at least a portion of the circumference of the housing 11 and the bearing member 12 where fretting damages are prone to occur. In the present embodiment, surface roughening may be applied in range A extending between −30 degrees to −70 degrees and/or 30 degrees to 70 degrees centered on axial center C of the bearing member 12 when the longer side direction N of the connecting rod 13 is defined as "0 degrees" as illustrated for example in FIG. 7. For example, surface roughening may be applied throughout the ranges of −70 degrees to −30 degrees and 30 degrees to 70 degrees or only in the range of 40 degrees to 60 degrees. Further, some portions along the axial center C may be surface roughened and some may not so that surface roughened portions and non-surface roughened portions co-exist along the axial direction. It is possible to reduce occurrence of fretting while reducing process steps by limiting surface roughening to range A where fretting is prone to occur.

Further, in the present embodiment, whichever has the smaller mean height Rc of the roughness curve element among housing inner peripheral surface 51 and bearing outer peripheral surface 52 may have Rc specified to X μm (Rc=X μm). In the present embodiment, "Rc" is the used as an index of roughness. This is due to the following reasons. It is required in the present embodiment to control the overall shape of the housing inner peripheral surface 51 or the bearing outer peripheral surface 52 rather than the peak-to-valley distance of the housing inner peripheral surface 51 or the bearing outer peripheral surface 52. The peak-to-valley distance is given by the sum of the maximum peak height and the maximum valley depth. In the present embodiment, "Rc" indicating the mean value of the sum of the peak height and the valley depth of the pairs of adjacent peaks and valleys is used as the index of roughness.

EXAMPLES

Next, a description will be given on EXAMPLES of the above described bearing device.

Figure 8:
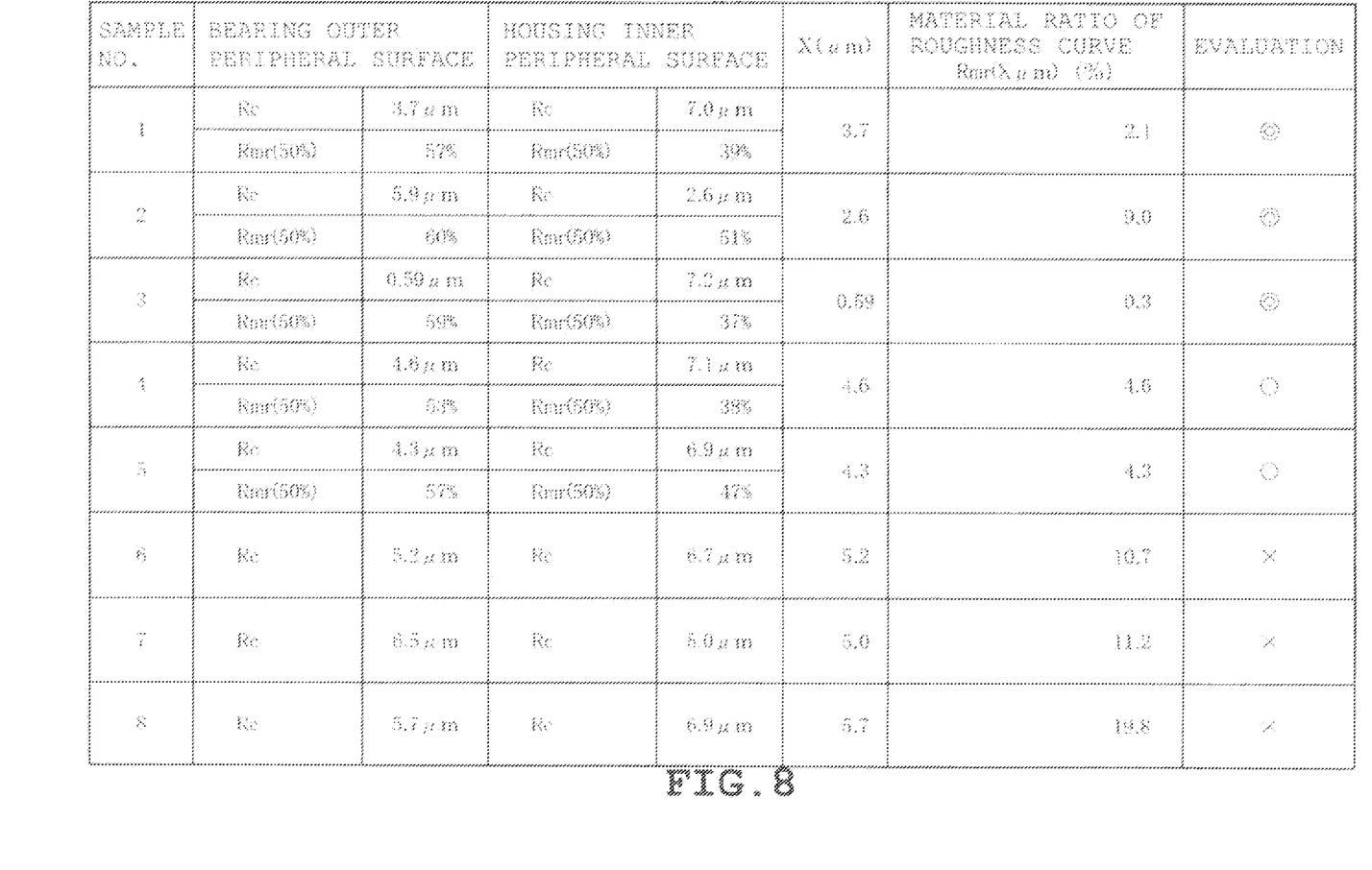
FIG. 8 is a chart briefly indicating the evaluations of EXAMPLES of one embodiment of the bearing device and evaluations of COMPARATIVE EXAMPLES.

As illustrated in FIG. 8, samples 1 to 8 of bearing members 12 were assembled with the housing 11, being structurally integral with the connecting rod 13, to verify the working of the bearing device 10 of the present embodiment. The bearing members 12 were sized to 46 mm in outer diameter, 16.5 mm in width, and 1.5 mm in thickness. Each bearing member 12 is configured as a double layered bearing alloy layer having a copper alloy stacked over a metal back formed of carbon steel. The connecting rod 13 is formed of carbon steel. The amount of oil clearance between the bearing member 12 and the counter member being supported by the bearing member 12 was specified to 0.06 mm.

Among the SAMPLES 1 to 8, samples 1 to 5 that satisfy the conditions of the present embodiment are EXAMPLES of the present embodiment. On the other hand, samples 6 to 8 that do not satisfy the conditions or the present embodiment ere COMPARATIVE EXAMPLES.

Evaluation was carried out based on the amount of deformation of the bearing member 12 when the bearing member 12 was assembled with one housing 11. That is, evaluation was carried out based on the amount of deformation of the bearing member 12 in the radially inward direction when the bearing member 12 was mounted on the housing 11 and fastened by a prescribed force by the bolts 41. When the amount of deformation was less than 0.05 times of the oil clearance, a rating of "very good" indicated as "⊚" in FIG. 8 was given. When the amount of deformation was equal to or greater than 0.05 times of the oil clearance but less than 0.1 times of the oil clearance, a rating of "good" indicated as "○" in FIG. 8 was given. The amount of deformation equal to or greater than 0.1 times the oil clearance is impermissible. Thus, when the amount of deformation was equal to or greater than 0.1 times of the oil clearance, a rating of "poor" indicated as "×" in FIG. 8 was given.

Fretting resistance was tested by repeatedly causing tensile deformation using a shaft passed through the bearing member 12 after the bearing member 12 was assembled with the housing 11, being structurally integral with the connecting rod 13. A test was conducted under a tensile load of 2.5 kN, frequency of 60 Hz, and repetition, of $4 \times 10^6$ times. Evaluation was made based on the presence/absence of fretting damages on the housing inner peripheral surface 51 and the bearing outer peripheral surface 52 after the test.

Among the housing inner peripheral surface 51 and the beating outer peripheral surface 52, whichever had the smaller mean height Rc was assumed to have material ratio Rmr of roughness curve of X μm and the remaining other of the housing inner peripheral surface 51 and the bearing outer peripheral surface 52 was measured based on such assumption. In this example, the evaluation length was 5 times the length of the sampling length.

A comparison of EXAMPLES (samples 1 to 5) with COMPARATIVE EXAMPLES (samples 6 to 8) shows that material ratio Rmr (X μm) of roughness curve of for each of EXAMPLES (samples 1 to 5) is equal to or less than 10% and greater than 10% for each of COMPARATIVE EXAMPLES (samples 6 to 8). Thus, COMPARATIVE EXAMPLES (samples 6 to 8) were rated as "x". It is believed that the clearance between the protrusions and recesses of the housing inner peripheral surface 51 and the bearing outer peripheral surface 52 become smaller when Rmr (X) becomes greater than 10% as was the case in COMPARATIVE EXAMPLES (samples 5 to 8). That is, when the clearance between the protrusions and recesses of the housing inner peripheral surface 51 and the bearing outer peripheral surface 52 become smaller, the shapes of the protrusions and recesses of the housing inner peripheral surface 51 and the bearing outer peripheral surface 52 become increasingly uniform as illustrated in FIG. 5 and become more easily engaged with one another. As a result, even a slight relative and overall movement in the circumferential direction between the housing 11 and the bearing member 12 is inhibited during assembly. This may increase the amount of protrusion of the deformed bearing member 12 in the radially inward direction. Thus, it can be understood from the comparison of EXAMPLES (samples 1 to 5) with COMPARATIVE EXAMPLES (samples 6 to 8) that slight overall movement is permitted during assembly when Rmr (X)≤10% and thus, the radially inward protrusion of the bearing member 12 is inhibited. It was also found that the structures of the EMBODIMENTS are advantageous in withstanding fretting.

Among EXAMPLES (samples 1 to 5), samples 1 to 3, in which the smaller of the mean heights Rc falls in the range of Rc≤4 μm, has reduced amount of protrusion in the radially inward direction as compared to samples 4 and 5 that do not satisfy this condition.

It can be understood from EXAMPLES (samples 1 to 5) that the smaller protrusions and recesses may be formed on either of the housing inner peripheral surface 51 or the bearing outer peripheral surface 52. That is, when the characteristics of the shapes of protrusions and recesses are different in the housing inner peripheral surface 51 and in the bearing outer peripheral surface 52, it is possible to generally contract the bearing member in the circumferential direction since slight overall movement is permitted even if stress is applied to the bearing member 12 when the bearing member 12 is assembled with the housing 11. Thus, similar effects can be obtained by causing the spacing created by the protrusions and recesses in the bearing member 12 side to be relatively larger and the spacing created by the protrusions and recesses in the housing 11 side to be relatively smaller so as to present a surface profile which is opposite of the surface profiles illustrated in FIG. 1, etc.

Further, the housing inner peripheral surface 51 and the bearing outer peripheral surface 52 may use materials such as an aluminum alloy, copper alloy, and titanium alloy that have smaller elastic coefficient than carbon steel.

The housing inner peripheral surface 51 and bearing outer peripheral surface 52 may be chemically treated by phosphating process, etching, etc. Further, plated coating based on Pb, Sn, Bi, etc., a DLC coating, or a ceramics coating may be applied to the housing inner peripheral surface 51 and bearing outer peripheral surface 52.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

What is claimed is:

1. A bearing device comprising: a bearing member provided with a circumferentially extending sliding surface; and a housing holding the bearing member on an inner circumferential surface thereof; wherein the bearing member is provided with a bearing outer peripheral surface on one side thereof facing the housing, the bearing outer peripheral surface being surface roughened, wherein the housing is provided with a housing inner peripheral surface on one side thereof facing the bearing member, the housing inner peripheral surface being surface roughened, and wherein when a mean height Rc of a roughness curve element of either of the bearing outer peripheral surface and the housing inner peripheral surface is X μm, the remaining other of the bearing outer peripheral surface and the housing inner peripheral surface has a material ratio Rmr (X μm) of roughness curve being equal to or less than 10% in at least one measurement direction.

2. The bearing device according to claim 1, wherein the bearing outer peripheral surface and the housing inner peripheral surface are provided with projections and recesses in which material ratio Rmr (50%) of roughness curve at cut level of 50% falls in a range of 20≤Rmr (50%)≤80% in two or more different measurement directions, and wherein, among the housing inner peripheral surface and the bearing outer peripheral surface, whichever having a smaller mean height Rc of the roughness curve element has a material ratio Rmr (50%) of the roughness curve falling in a range of 40%≤Rmr (50%)≤60%.

3. The bearing device according to claim 1, wherein, among the housing inner peripheral surface and the bearing outer peripheral surface, whichever having a smaller mean height Rc of the roughness curve element has a mean height Rc falling in a range of Rc≤4 μm.

4. The bearing device according to claim 1, wherein the bearing outer peripheral surface and the housing inner peripheral surface are at least surface roughened at least in a particular portion.

5. The bearing device according to claim 1, further comprising a connecting rod being connected to an engine piston, wherein the housing is provided on one end of the connecting rod opposite of the end being connected to the engine piston, and wherein surface roughening is applied in a range of the bearing outer peripheral surface and the housing inner peripheral surface extending from −70 degrees to −30 degrees and from 30 degrees to 70 degrees centered on an axial center of the bearing member when 0 degrees is taken along a longer side direction of the connecting rod.

6. A half bearing used in the bearing device according to claim 1 being circumferentially divided in two.

7. An engine provided with the bearing device according to claim 1.

* * * * *